United States Patent [19]

Long et al.

[11] 4,082,001
[45] Apr. 4, 1978

[54] NON-DESTRUCTIVE METHOD FOR APPLYING AND REMOVING INSTRUMENTATION ON HELICOPTER ROTOR BLADES

[75] Inventors: Walt C. Long; Milton L. Williams, both of Hampton, Va.

[73] Assignee: The United States of America as represented by the United States National Aeronautics and Space Administration, Washington, D.C.

[21] Appl. No.: 788,705

[22] Filed: Apr. 19, 1977

[51] Int. Cl.² .................. G01L 9/00; B64C 27/46
[52] U.S. Cl. ........................ 73/756; 73/456; 416/61; 416/144

[58] Field of Search .............. 73/420, 455, 456; 416/61, 62, 144; 156/64

[56] References Cited

U.S. PATENT DOCUMENTS

| 1,385,802 | 7/1921 | St. John | 416/144 |
| 3,547,555 | 12/1970 | Jensen | 416/61 |

Primary Examiner—James J. Gill
Attorney, Agent, or Firm—Wallace J. Nelson; John R. Manning; Howard J. Osborn

[57] ABSTRACT

A nondestructive method of applying and removing instrumentation on airfoils.

12 Claims, 5 Drawing Figures

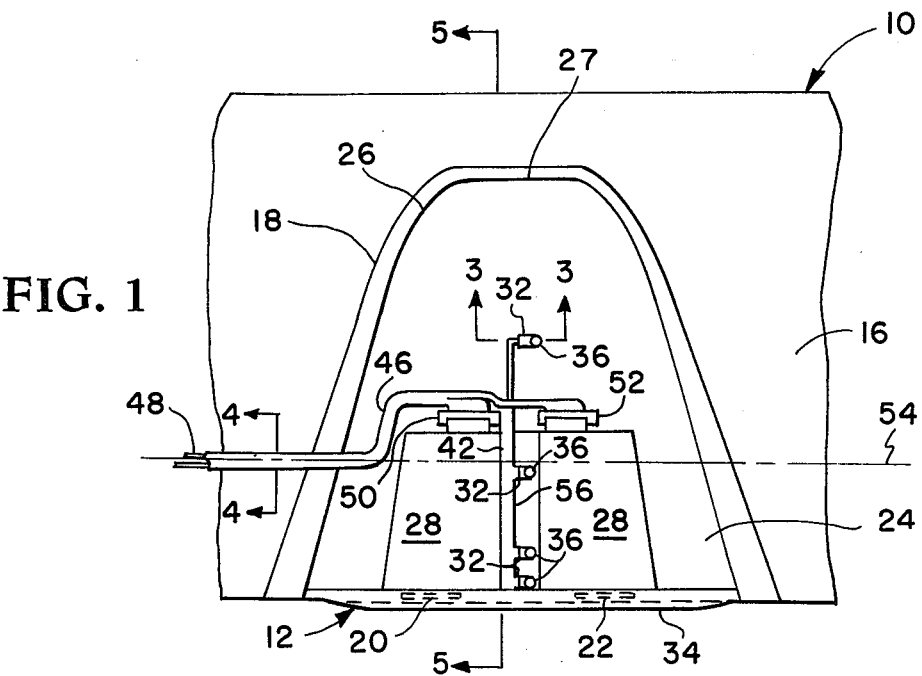
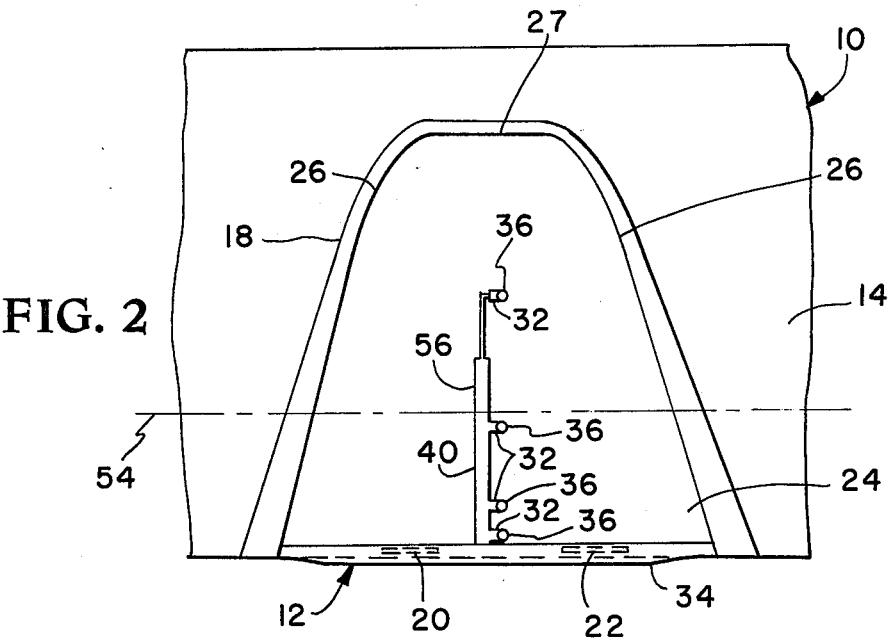

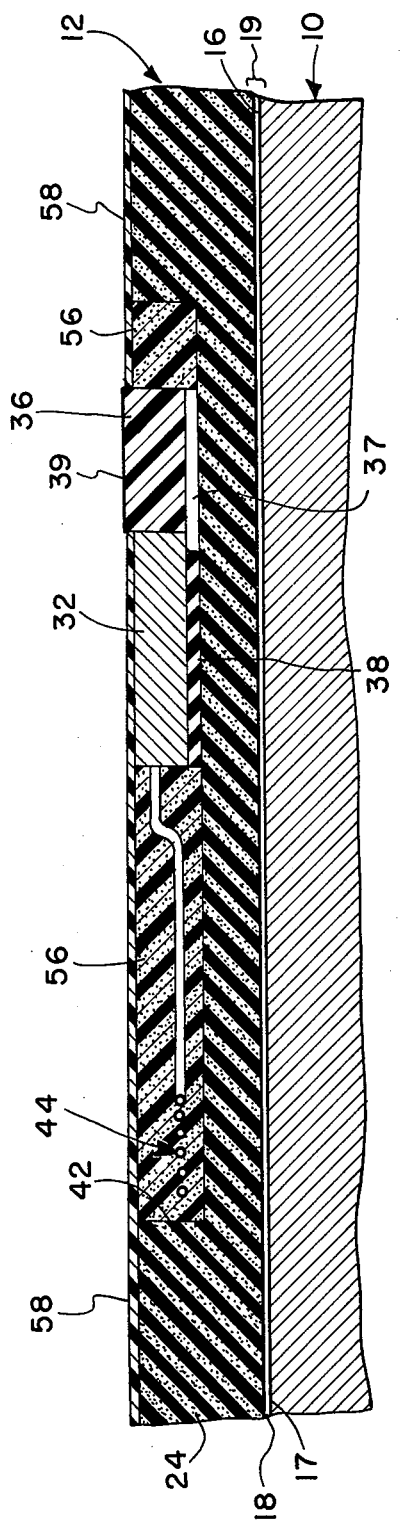
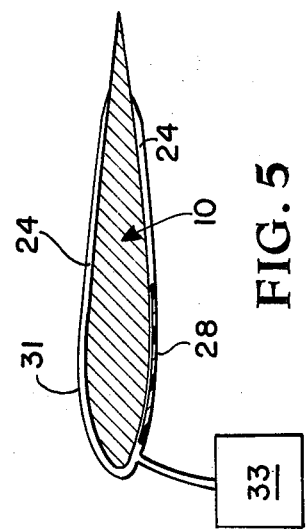
FIG. 3
FIG. 4
FIG. 5

NON-DESTRUCTIVE METHOD FOR APPLYING AND REMOVING INSTRUMENTATION ON HELICOPTER ROTOR BLADES

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates generally to methods of airfoil pressure instrumentation and more particularly to a nondestructive method of applying and removing external pressure instrumentation to helicopter rotor blades without significantly affecting the aerodynamics of the blade and without damaging or altering the blade structure.

DESCRIPTION OF THE PRIOR ART

Investigation of helicopter rotor blade performance and noise sources requires an accurate definition of the air pressures operating on a given rotor blade section when the rotor is in operation. In order to generate an accurate rotor blade pressure profile, it is essential that the instrumentation used conform as closely as possible to the existing blade shape in order to minimize error from aerodynamics factors. It is also desirable from a cost and safety standpoint that the structure of the blade to be tested remain unaltered and the design strength of the airfoil be maintained and that the instrumentation be removable so that the airfoil may be reused. It is further desirable that the instrumentation used be small in size, lightweight, accurate and capable of data transmission through a rotary connection in the case of helicopter instrumentation.

Several existing methods of instrumentation meet some but not all of the above-mentioned criteria. In general, existing instrumentation is either applied to the external airfoil surface or mounted internally with only the sensing elements exposed to the airfoil surface. Presently available external instrumentation either significantly alters the aerodynamic shape of the airfoil to which it is applied, thus yielding inaccuracies with respect to the airfoil pressure profile, or requires some form of mechanical bonding which results in damage to the airfoil. All presently available internally mounted instrumentation necessitates structural modification of the airfoil, thus greatly increasing costs and reducing airfoil life. One type of nondestructive, low-profile external instrumentation currently in use employs air passages formed by a flexible rubber strip; however, this type of instrumentation is unsatisfactory for rotary wing application due to the impossibility of transmitting pressure readings from the rotary wing.

SUMMARY OF THE INVENTION

Accordingly, an object of the present invention is to provide a method for applying instrumentation to an airfoil such that the airfoil structure is neither damaged nor altered and may be reused upon removal of the instrumentation.

Another object of the present invention is to provide a method for applying instrumentation to an airfoil in such a manner that the aerodynamic properties of the airfoil remain significantly unaltered.

Yet another object of the present invention is to provide a method of instrumenting helicopter rotor blades capable of being used for inflight pressure data measurement.

According to one embodiment of the present invention the foregoing and other objects are attained by removing the paint from the top and bottom of a helicopter rotor blade where the pressure instrumentation is to be applied, and thoroughly cleaning the area with methylethylketone and trichlorotrifluoroethane. Glass fiber cloth is then bonded to the treated area by means of a fuel-resistant adhesive applied to the treated area which resists dissolution by jet fuels and other petroleum products yet is readily dissolvable by more powerful solvents such as methylethylketone. This contact adhesive and glass fiber cloth substrate serves to protect the rotor blade from the harmful effects of epoxy resins and to provide an easily strippable base for the ultimate removal of the instrumentation.

If needed, a pair of sheet lead weights are then bonded to the leading edge of the helicopter rotor blade with epoxy cement. Cellulose acetate foam filler material is then bonded by means of epoxy cement over the lead balance weights after having first been properly relieved to conform to the leading edge of the rotor blade. Cellulose acetate foam is also epoxy-cemented to the top and bottom of the rotor blade and trimmed to form a taper as the material approaches the trailing edge of the blade. The cellulose acetate foam applied to the bottom of the rotor blade is also relieved to accept a printed circuit board approximately ninety thousands inch thick. The printed circuit board is precontoured to conform to the lower blade curvature and is positioned immediately aft of the blade leading edge.

Prior to bonding the printed circuit board to the foam and rotor blade, the foam on both the top and bottom of the rotor blade is faired to the contours of the rotor blade and reduced to the thickness of the printed circuit board. The foam and glass fiber substrate laminate is feathered into the rotor blade surface at both edges and aft of the printed circuit board. The trailing edge of the laminate is tapered to a feather edge over a distance of approximately 6 inches in order to reduce the possibility of airflow separation.

After the foam fairing operation, the printed circuit board is cemented into its recess by applying epoxy cement to the board edges and clamping it in place with a vacuum bag to which a 30-inch vacuum is applied. Once the printed circuit board cementing operation is complete, the pressure transducers are mounted in any desired location on both the top and bottom rotor surfaces in recesses cut in the cellulose acetate foam. The transducers are secured in their recesses with self-vulcanizing silicone rubber. In mounting the transducers, care must be exercised to insure that the transducer diaphragm will be level and flush with the exterior profile of the completed instrument package and that no silicone rubber adhesive is in the recess directly below the diaphragm portion of the transducers. The installed transducers and printed circuit board are then connected by wiring which is installed in wireways recessed into the cellulose acetate foam and held in place by quick-setting epoxy resin. The instrument wiring is routed from the instrument package to the aircraft's onboard readout equipment along the underside of the rotor blade at the one-fourth chord line and is held in place by quick-setting epoxy resin. All wireways, low areas in the cellulose acetate foam are filled in with epoxy casting resin which is faired to the level of surrounding material upon curing.

The entire assembly excluding the pressure transducers and including the underside wireways, is then covered with three layers of epoxy resin-saturated, 1 mil glass fiber cloth, which is trimmed for clearance around the printed circuit board and pressure transducers. As the glass fiber cloth laminate is built up, the outer edges of each successive layer are cut to overlap the preceding layer by approximately ¼ inch to allow for a smooth transition to the rotor blade surface. The printed circuit board is also covered with epoxy resin; however, the pressure transducer diaphragms are kept open and uncovered. A final covering of epoxy resin saturated, one mil glass fiber cloth is applied over the entire assembly, excepting the transducer diaphragms. Upon curing of this final layer, the entire assembly is smoothed by sanding with fine abrasives, with care taken not to damage the transducer diaphragms which are flush with the completed laminate.

Various other objects and advantages of this invention will be readily apparent from the following detailed description of the preferred embodiment thereof, when considered in connection with the accompanying drawings.

BRIEF DESCRIPTION OF THE DRAWINGS

FIG. 1 is a plan view of the bottom portion of a helicopter rotor blade instrumentation package constructed according to the present invention;

FIG. 2 is a plan view of the top portion of a helicopter rotor blade instrumentation package constructed according to the present invention;

FIG. 3 is a fragmentary sectional view taken along lines 3—3 of FIG. 1;

FIG. 4 is a fragmentary section view taken along lines 4—4 of FIG. 1; and

FIG. 5 is a sectional view taken along lines 5—5 of FIG. 1.

DESCRIPTION OF THE PREFERRED EMBODIMENT

Referring now to the drawings wherein like reference characters designate identical or corresponding parts, and more particularly to FIGS. 1, 2 and 3 wherein the bottom, top and sectional views of one embodiment of the present invention are depicted, helicopter rotor blade, designated generally by the reference numeral 10, is prepared for installation of the instrument package, designated generally by the reference numeral 12, by removing the paint from the top and bottom rotor surfaces 14 and 16, respectively, of the area to be instrumented and cleansing the area first with methylethylketone and secondly with trichlorotrifluoroethane. Upon completion of the cleansing operation, a thin coat of fuel resistant, yet dissolvable, adhesive 17 is brushed onto the rotor surface and allowed to dry for approximately one hour. Any suitable commercial adhesive such as Scotch-Clad No. EC-776, an adhesive manufactured by The Minnesota Mining & Manufacturing Company, Inc., St. Paul, Minn., may be used for adhesive coat 17 provided that the adhesive used completely resist dissolution by jet fuel or other petroleum products yet be readily soluble in more powerful solvent such as methylethylketone.

After the first coat of adhesive 17 has cured, a second coat of adhesive is brushed onto the first coat, and a single layer of four mil glass fiber cloth 18 is applied to the rotor surface and trimmed to the desired shape while the contact adhesive is still wet. The second coat of adhesive 17 and glass fiber cloth 18 is then allowed to air dry for approximately 72 hours. The substrate 19 formed by adhesive 17 and glass fiber cloth 18 serves as an easily strippable base for the ultimate removal of instrumentation package 12.

In order to maintain proper natural frequency, it is necessary to affix weights 20 and 22 to the leading edge of rotor blade 10. Weights 20 and 22 are constructed from one thirty-second inch lead sheet weighing 2 pounds per square foot, and are shaped to conform to the leading edge of rotor blade 10. Weights 20 and 22 are bonded to the leading edge of rotor blade 10 with epoxy resin cement (such for example 3M's Scotweld No. 2216 A/B). Weights 20 and 22 are centered with respect to the chordal axis of instrumentation 12 and are held in place within masking tape or other suitable means for approximately 12 hours at ambient condition until the epoxy cement cures.

After the weight bonding process is completed, a suitable filler material, such as cellulose acetate foam 24, of approximately ⅛ inch thickness is bonded with the same or equivalent epoxy resin cement to the glass fiber cloth substrate 18 on both the top and bottom of the rotor blade. Cellulose acetate foam 24 is also bonded to the leading edge of rotor blade 10 after having been shaped to conform to the leading edge and recessed to clear balance weights 20 and 22. The lateral and after edges, 26 and 27, respectively, of foam 24 are trimmed such that they lie from 1 to 3 inches within the border of glass fiber cloth substrate 18 in order to allow for feathering of instrumentation package 12. Prior to bonding cellulose acetate foam 24 onto the bottom surface 16 of the rotor blade, the foam is cut away to conform to the external dimension of printed circuit board 28 in order that the printed circuit board may be recessed within foam 24. For helicopter rotor blades instrumentation, printed circuit board 28 should be no thicker than 90-thousandths inch and should be positioned on the underside of rotor blade 10 as closely as practicable to the leading edge thereof. As hereinabove stated, foam 24 is bonded to substrate 18 with epoxy resin cement and is held in place during the bonding process with shot bags or other suitable means for approximately twelve hours at ambient conditions until the epoxy resin cement has cured.

Upon completion of the cellulose acetate filler material bonding process, the filler material 24 is faired to conform as closely as possible to the contour of rotor blade 10, by means of sanding to conform with fairing strips (not shown) temporarily attached to the blade. In the present helicopter rotor embodiment, foam 24 on the top and bottom of rotor blade 10 is sanded to a maximum thickness of approximately one-tenth inch adjacent to the location of pressure transducers 32 and printed circuit board 28. The minimum acceptable thickness in this area is ninety-three thousandths inch from the surface of glass fiber substrate 18. Lateral edges 26 are tapered over a distance of approximately one inch to form a feather edge with substrate 18, and after edges 27 are tapered over a distance of approximately 6 inches to a similar feather edge with substrate 18. Leading edge 37 of foam 24 is similarly faired to conform as closely as possible with the leading edge of rotor blade 10 and to present a smooth transition into the top and bottom surface of foam 24. It is essential that all foam fairing and sanding be completed prior to the installation of printed circuit board 28 and transducers 32.

As shown in FIG. 5, printed circuit board 28 is bonded into its recess after completion of the foam fairing process by applying the epoxy resin cement described above to the edges thereof and holding in place by means of a vacuum bag 31 to which a 30-inch vacuum from vacuum source 33 has been applied. It should be noted that printed circuit board 28 is preformed to the contour of rotor blade 10. Approximately twelve hours at ambient conditions should be allowed for the epoxy resin cement used to bond printed circuit board 28 in its recess to cure.

Upon completion of the installation of printed circuit board 28, transducers 32 are installed. Transducers 32 may be installed in any desired location within the limits of foam 24 where there is sufficient depth of foam to allow the diaphragm 36 of transducers 32 to be mounted flush with the completed instrumentation package 12, as will be discussed hereinbelow. Transducers 32 are mounted by cutting a recess in foam 24 conforming to the planform shape of transducers 32 to a depth of approximately 40 -thousandths of an inch. Transducers 32 are bonded in their recesses by means of self-vulcanizing silicone rubber adhesive 38 (General Electric's RTV-102 or equivalent). When installing transducers 32, care must be exercised to insure that the entire unit is mounted level and high enough that transducer diaphragm 36 will be exactly flush with the completed instrument package layup. It is also very important that there be no silicone rubber adhesive in the area 37 beneath diaphragm 36. Furthermore, the upwardly disposed surface of diaphragm 36 should be temporarily covered with protective tape 39 to insure that no bonding materials come in contact with it.

Top and bottom wireways, 40 and 42, respectively, are then cut into foam 24, and transducer wiring, designated generally by the reference character 44, connecting transducer 32 to printed circuit board 28, is installed therein. Main readout wireway 46 is also cut into foam 24 and main readout wiring, designated generally by the reference numeral 48, is installed therein and connected to printed circuit board 28 by means of connector plugs 50 and 52. Main readout wiring 48 is routed to the hub of rotor blade 10 along the rotor 25% chord line 54 on the underside of blade 10. Wiring 48 and 44 are temporarily tacked in place with a suitable quick-setting epoxy resin cement, such for example as EPO TEK 201 a two component, fluid, clear, fast-setting room temperature curing epoxy available from Epoxy Technology, Inc. Watertown, Mass.

Upon completion of all wiring, wireways 40, 42 and 46 and all other low areas in both the top and bottom surfaces of foam 24 are filled in with epoxy casting resin 56 to which silicone dioxide filler has been added.

In the specific embodiment described herein, a mixture of 87 percent by weight Epon 828 resin, eleven percent by weight diaethylene triamine and 2 percent by weight silica filler is employed. Epon 828 is a product of the Shell Chemical Corporation and the silica filler employed was Cab-O-Sil, a product of the Cabot Corporation, Boston, Mass. Epoxy filler 56 is allowed to cure for approximately twenty four hours and then sanded until it is flush or faired with the surface of foam 24.

The final step in constructing instrumentation package 12 is the installation of an erosion-proof cover 58 over the entire surface of foam 24 and main readout wiring 48. Cover 58 is comprised of four layers of epoxy resin-saturated 1-mil glass fiber cloth. The layers are applied one at a time and are sized such that each succeeding layer overlaps the edge of the preceding layer by approximately ¼ inch in order to provide a tapered transition to the top and bottom surface 14 and 16 of rotor blade 10. Each layer is applied in sequence by first brushing catalyzed epoxy resin (Epon 828 catalyzed with eleven percent diaethylene triamine) over the entire surface of foam 24, excepting printed circuit board 28 and transducer diaphragms 36, and then applying a layer of cloth. The first three layers of cloth are trimmed around printed circuit panel 28 and transducer diaphragms 36; however, the final layer is trimmed only around transducer diaphragms 36 and is bonded to the surface of printed circuit board 28 as well as to the preceding layer. After the final layer of 1-mil fiber cloth has been applied, a finish coating of the catalyzed epoxy resin is applied to ensure a smooth surface. Upon curing of the entire cover 58 laminate at ambient conditions, the surface thereof is faired and smoothed by sequential sanding with 400, 500 and 600 grade sandpaper. After the sanding operation is completed the protective tape 39 is removed from transducer diaphragm 36 and instrumentation package 12 is ready for inflight testing.

Upon completion of inflight testing, instrumentation package 12 may be entirely removed from rotor blade 10 either mechanically or by dissolving the fuel resistant contact adhesive used to bond glass fiber cloth 18 to the rotor blade surface with a suitable solvent such as methylethylketone. Main readout wiring 48 and cover 58 may also be removed in a similar fashion.

Airfoil instrumentation applied according to the method of the present invention, therefore, conforms closely to the original airfoil profile thus minimizing aerodynamic inaccuracies; it may be installed with substantially no damage to or alteration of the airfoil structure; and is lightweight, accurate and capable of data transmission from a rotating helicopter blade. Obviously, numerous modifications of the present invention are possible in light of the above teachings. It should be particularly noted that any equivalent material may be substituted for the specific adhesives, solvents and materials specified hereinabove for use in the illustrated embodiment. It is therefore to be understood that within the scope of the appended claims the invention may be practiced otherwise than as specifically described herein.

What is claimed as new and desired to be secured by Letters Patent of the United States is:

1. A method for applying removable instrumentation to an airfoil while maintaining essentially the same aerodynamic characteristic of the airfoil comprising the steps of:
   preparing the area of the airfoil that is to be instrumented; applying a protective substrate of adhesive dissolvable in methylethylketone to the top, bottom and leading edge of the airfoil;
   positioning and bonding balance weights to the leading edge of the airfoil;
   bonding filler material to the top, bottom and leading edge of the airfoil;
   fairing the filler material;
   bonding instrumentation to the airfoil and filler material; and
   applying a coat of epoxy resin-saturated glass fiber cloth over the surface of the instrumentation.

2. The method according to claim 1 wherein the step of preparing the area of the airfoil to be instrumented comprises removing paint from the area to be instrumented using a conventional solvent, and cleaning the surface of the airfoil with methylethylketone and trichlorotrifluoroethane.

3. The method according to claim 1 wherein the step of applying the protective substrate consists of applying a thin coat of a fuel-resistant contact adhesive dissolvable in methylethylketone to the surface of the airfoil, drying the coat for approximately 1 hour at ambient temperature, applying a second coat of the fuel-resistant contact adhesive, fitting a layer of 4-mil fiber glass cloth onto the adhesive while the adhesive is still wet, and air drying the cloth and adhesive for approximately 72 hours.

4. The method according to claim 1 wherein the step of positioning and bonding the balance weight to the leading edge of the airfoil comprises the steps of reestablishing the chord balance of the airfoil by counterbalancing the weight of the instrumentation with a plurality of lead balance weights and bonding the plurality of lead balance weights to the leading edge of the airfoil.

5. The method according to claim 4 wherein the step of bonding the plurality of lead balance weights to the leading edge of the airfoil consists of shaping two pieces of lead ballasts to conform to the leading edge of the airfoil, abrading the side of the lead ballasts that is to be bonded, rinsing the lead ballast with trichlorotrifluoroethane, applying to the abraded surface of the lead ballast a coat of catalyzed epoxy resin adhesive, centering the lead ballasts with respect to the instrumentation, clamping the lead ballasts onto the leading edge of the airfoil, and allowing the catalyzed epoxy resin adhesive to cure at ambient conditions.

6. The method according to claim 5 wherein the step of bonding filler material to the top, bottom and leading edge of the airfoil comprises the steps of shaping a piece of cellulose acetate foam filler material to conform to the leading edge of the airfoil, relieving the shaped surface of the cellulose acetate foam to provide clearance for the balance weights, abrading the exposed surfaces of the balance weights, rinsing the balance weights and the leading edge of the airfoil with trichlorotrifluoroethane, applying a coat of catalyzed epoxy resin adhesive to the shaped surface of the cellulose acetate foam, clamping the cellulose acetate foam in position on the leading edge of the airfoil, allowing the catalyzed epoxy resin adhesive to cure at ambient conditions, shaping a piece of cellulose acetate foam filler material to cover the area to be instrumented on the top surface of the airfoil, applying a coat of catalyzed epoxy resin adhesive to the cellulose acetate foam, clamping the cellulose acetate foam to the protective substrate on the top surface of the airfoil, allowing the catalyzed epoxy resin adhesive to cure at ambient condition, shaping a piece of cellulose foam filler material to cover the area to be instrumented on the bottom surface of the airfoil, applying a coat of catalyzed epoxy resin adhesive to the cellulose acetate foam, clamping the cellulose acetate foam to the protective substrate on the bottom of the airfoil, allowing the catalyzed epoxy resin adhesive to cure at ambient condition and providing a recess for the instrumentation in the cellulose acetate foam bonded to the bottom surface of the airfoil.

7. The method according to claim 1 wherein the step of fairing the filler material consists of placing a pair of glass-laminate fairing strips adjacent to the area to be faired and abrasively reducing the filler material to the shape of the glass-laminate fairing strips that is consistent with the original aerodynamic characteristics of the airfoil.

8. The method according to claim 1 wherein the step of bonding instrumentation to the airfoil and filler material comprises the steps of providing a printed circuit board, providing a recess for the printed circuit board in the filler material on the bottom of the airfoil, rinsing the printed circuit board with methylethylketone, applying a coat of catalyzed epoxy resin adhesive in a narrow band around the bottom edges of the printed circuit board, positioning the printed circuit board in said resin, covering the printed circuit board and airfoil with a vacuum bag, placing the vacuum bag under a thirty inch vacuum, allowing the catalyzed resin adhesive to cure at ambient conditions.

9. The method according to claim 1 wherein the step of bonding instrumentation to the airfoil and filler material comprises the steps of providing a plurality of pressure transducers and installing the transducers by cutting a recess in the filler material for each of the transducers at the desired location of the transducers, the recess being the exact size of each of the transducers, bonding the transducers in the recesses with self-vulcanizing silicone rubber taking care to keep the silicone rubber away from the diaphragm of the transducers, and allowing the silicone rubber to cure at ambient conditions.

10. The method according to claim 1 wherein the step of bonding instrumentation to the airfoil and filler material comprises the step of providing instrument wiring and installing the wiring by cutting a wireway in the filler material, the wireway beginning at the instrumentation nearest the trailing edge on the upper surface of the airfoil and running forward and around the leading edge of the airfoil and back across the bottom thereof; tacking the wiring in place in the wireway with quick-setting epoxy resin adhesive; filling the wireway with a mixture comprised of eighty-seven percent by weight epoxy casting resin, 11 percent by weight diaethylene triamine and 2 percent by weight polygenic silica filler, allowing the mixture to cure at ambient conditions and fairing the cured mixture.

11. The method according to claim 1 containing the further steps of providing instrument readout wiring and installing the readout wiring by cutting a wireway in the filler material on the bottom of the airfoil, the wireway being parallel to the leading edge of the airfoil and located at the 25% chord line thereof; tacking the readout wiring in place in the wireway and along the 25% chord line on the underside of the airfoil with quick setting epoxy adhesive; filling the wireway with a mixture compound consisting of 87 percent by weight of epoxy coating resin, 11 percent by weight of diaethylene triamine and 2 percent by weight of polygenic silica filler, covering that portion of the readout wiring attached to the underside of the airfoil with a coat of epoxy resin saturated glass fiber cloth, allowing the filler material and the coat of epoxy resin-saturated glass fiber cloth to cure at ambient conditions; and fairing both the cured filler material and the cured glass fiber cloth coat.

12. The method according to claim 1 wherein the step of applying a coat of epoxy resin-saturated glass filler cloth comprises the steps of applying a coat of catalyzed epoxy resin over the entire surface of the filler material, excluding the instrumentation; allowing the coat of catalyzed epoxy resin to cure at ambient conditions until tacky; covering said area with a layer of 1 mil glass fiber cloth; repeating the procedure twice for a total of three layers, allowing each succeeding layer to overlap the preceding one by one fourth inch; applying a coat of catalyzed epoxy resin to the entire surface of the third layer and the instrumentation, excluding only the receptor areas of the instrumentation, extending to the outer edges of the protective substrate of dissolvable adhesive and glass fiber cloth; covering the entire coated surface with a fourth layer of 1 mil glass fiber cloth; covering the entire surface of said fourth layer with a coat of catalyzed epoxy resin; maintaining the finished surface of the coat of epoxy resin-saturated glass fiber cloth flush with the surface of the instrumentation receptor areas; allowing the catalyzed epoxy resin to cure at ambient conditions; and sanding said coat of epoxy resin saturated glass fiber cloth until smooth.

* * * * *